(12) United States Patent
Kim et al.

(10) Patent No.: US 10,086,854 B2
(45) Date of Patent: Oct. 2, 2018

(54) HOLD-BACK DEVICE FOR CARRIAGE

(71) Applicant: Hyundai Motor Company, Seoul (KR)

(72) Inventors: Hyun Min Kim, Ulsan (KR); Jung Hun Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 43 days.

(21) Appl. No.: 14/960,345

(22) Filed: Dec. 5, 2015

(65) Prior Publication Data
US 2017/0088152 A1   Mar. 30, 2017

(30) Foreign Application Priority Data
Sep. 25, 2015   (KR) .................. 10-2015-0136202

(51) Int. Cl.
| | | |
|---|---|---|
| *B65G 47/88* | (2006.01) | |
| *B61K 7/02* | (2006.01) | |
| *B65G 35/06* | (2006.01) | |

(52) U.S. Cl.
CPC .............. *B61K 7/02* (2013.01); *B65G 35/06* (2013.01); *B65G 2201/0294* (2013.01)

(58) Field of Classification Search
CPC ............. B65G 47/88; B65G 47/8823; B65G 2205/04; B61K 7/08; F16D 63/008; F16D 2065/022; F16D 2065/028; F16D 2125/26; F16D 2127/06; B62D 65/18
USPC ........ 193/35 A; 198/345.3; 188/31, 69, 301; 280/33.994; 16/66
See application file for complete search history.

(56) References Cited

U.S. PATENT DOCUMENTS

| | | | | |
|---|---|---|---|---|
| 1,421,666 A | * | 7/1922 | Bryon ................ | E05F 3/06 16/66 |
| 3,059,269 A | * | 10/1962 | Selinger ............. | E05F 3/02 137/860 |
| 3,394,945 A | * | 7/1968 | Steier ................ | B60B 33/00 188/31 |
| 3,473,642 A | * | 10/1969 | Mcconnell ........ | B65G 13/075 193/35 A |
| 3,557,925 A | * | 1/1971 | Zulauf .............. | B65G 13/075 193/35 A |
| 4,000,796 A | * | 1/1977 | Bolton .............. | B65G 13/075 188/262 |

(Continued)

FOREIGN PATENT DOCUMENTS

| | | |
|---|---|---|
| JP | 05-085728 U | 6/1993 |
| JP | 2001-31378 | 2/2001 |

(Continued)

*Primary Examiner* — Bradley T King
*Assistant Examiner* — Stephen M Bowes
(74) *Attorney, Agent, or Firm* — Mintz Levin Cohn Ferris Glovsky and Popeo, P.C.; Peter F. Corless

(57) ABSTRACT

A device for restricting movement of a carriage that is used to convey vehicles and workers in an assembly line in a factory for assembling complete vehicles includes a hold-back device for the carriage which can prevent an accident caused by equipment failure and improves an operating rate by implementing a new conceptual hold-back system which allows a cam roller operated by a cylinder to come into close contact with a side surface of the carriage to rotate in a direction identical to a carriage movement direction, and provides a load to the carriage by using back pressure/discharged air from the cylinder so as to prevent an increase in gap between carriages.

12 Claims, 3 Drawing Sheets

(56) References Cited

U.S. PATENT DOCUMENTS 4,662,500 A * 5/1987 Agnew .............. B65G 47/8823
  193/35 A
6,119,843 A * 9/2000 Robinson ........... B65G 47/8823
  193/35 A
6,164,430 A * 12/2000 Nishimura ......... B65G 47/8815
  198/345.1

FOREIGN PATENT DOCUMENTS

| KR | 10-2004-0059709 A | 7/2004 |
| KR | 10-0950684 | 3/2010 |
| KR | 10-2010-0035246 | 4/2010 |
| KR | 10-1273477 | 6/2013 |

* cited by examiner

HOLD-BACK DEVICE FOR CARRIAGE

CROSS-REFERENCE TO RELATED APPLICATION

This application claims under 35 U.S.C. § 119(a) the benefit of Korean Patent Application No. 10-2015-0136202 filed on Sep. 25, 2015, the entire contents of which are incorporated herein by reference.

BACKGROUND (a) Technical Field

The present invention relates to a hold-back device for a carriage, more particularly, to a device for restricting movement of a platform carriage that is used to convey vehicles and workers in an assembly line of a factory for assembling complete vehicles.

(b) Description of the Related Art

In general, in a vehicle production line, a plurality of rows of assembly lines are arranged in parallel in the production line for assembling a vehicle, and various components are assembled into a vehicle body while the vehicle body is conveyed along the plurality of assembly lines in a state in which the vehicle body is placed on a carriage.

In the production line, various components are assembled into the vehicle while the carriage on which the vehicle is placed and a vacant carriage on which no vehicle is placed are moved from one line to another line.

Typically, separate rails are installed on a floor between the respective lines, and the carriage is conveyed to the next line across a passage between the respective lines.

For example, a hold back system, which is adopted in a factory for assembling complete vehicles, refers to equipment for preventing an increase in interval between carriages that are used to convey vehicles and workers in trim/final/chassis marriage lines in the factory for assembling the complete vehicles.

In the hold-back system, when rollers are attached to a motor and both surfaces of the carriage are pushed at a driving unit in each line (at one starting position in each line), thirty to forty carriages are simultaneously moved along a free roller track.

When the line is stopped (break time/meal time/closing time/non-operation) during the movement of the carriages, the carriages, which are being moved forward, are pushed by inertia instead of being stopped, and as a result, a gap occurs between the carriages.

In a case in which the gap between the carriages is large, a worker's foot may fall into the gap between the carriages, thus causing an accident, and the carriage cannot be stopped at a position that requires automation and synchronization, such that a non-operation occurs when the carriages are restarted.

In order to prevent the above problem, rollers are attached to an electric motor at a driven unit (at the end of an assembly process) in each line, and the rollers are rotated reversely to push the carriages reversely, thereby preventing an increase in the gap between the carriages.

The hold-back device for a carriage in the related art includes an electric torque motor, a speed reducer, and a driving roller which is mounted on a speed reducer shaft and comes into contact with the carriage, and when the carriage is moved, the driving roller rotates by an operation of the electric torque motor in a reverse direction to a direction in which the carriage is moved, thereby pushing the carriages in the reverse direction while providing friction interference to the carriages.

Further, when the motor is stopped when the line is stopped, the rotation of the driving roller is stopped, thereby stopping the carriage.

However, because the carriage moves in a forward direction and the driving roller rotates in the reverse direction, there is a problem in that a large amount of load is applied to the electric torque motor.

The electric torque motor is manufactured to endure high-temperature heat (80° C. to 125° C.), but as the high-temperature heat is continuously generated, an accident and a non-operation often occur due to frequent failure of the motor.

The above information disclosed in this Background section is only for enhancement of understanding the background of the invention and therefore it may contain information that does not form the prior art that is already known in this country to a person of ordinary skill in the art.

SUMMARY

The present invention provides a hold-back device for a carriage which can prevent an accident caused by equipment failure and improves an operating rate by implementing a new conceptual hold-back system which allows a cam roller operated by a cylinder to come into close contact with a side surface of the carriage to rotate in a direction identical to a carriage movement direction, and provides a load to the carriage by using back pressure/discharged air from the cylinder so as to prevent an increase in the gap between the carriages.

The hold-back device for a carriage provided by the present invention has the following characteristics in order to achieve the above object.

The hold-back device for a carriage includes a main frame, a cylinder frame which is rotatably installed on the main frame, a cylinder which is installed on the cylinder frame and provides back pressure when a cam roller is rotated, a cam roller which is rotatably installed on the cylinder frame, eccentrically connected to a rod of the cylinder so as to be operated in conjunction with the rod, and rotated while coming into contact with the carriage, and a spring and a spring bar which elastically support the entirety of the cylinder frame including the cam roller and the cylinder to the carriage.

Therefore, the hold-back device for a carriage provides a load to the carriage by back pressure/discharged air from the cylinder so as to prevent an increase in the gap between the carriages by using the cam roller that is operated on the principle of a train wheel or a millstone, and rotates in a direction identical to a carriage movement direction, thereby preventing an accident and improving an operating rate.

Here, one side of a peripheral portion of the cam roller may be connected with the rod of the cylinder by a roller pin, and the rod of the cylinder may also be operated in conjunction with the cam roller while being drawn out or pushed in together with the cam roller when the cam roller is rotated in a direction identical to the carriage movement direction by coming into contact with the carriage.

In addition, the cylinder may include a brake device for stopping an operation of the cylinder and the rotation of the cam roller.

Further, a tip portion of the spring bar may be connected with a cylinder frame through a hinge pin, and a rear end portion of the spring bar may be installed to be penetratively supported on a vertical plate disposed on the main frame, and the spring may be installed to be interposed between the spring bar and the vertical plate so as to provide elasticity to the spring bar.

The hold-back device for a carriage provided by the present invention has the following advantages.

First, it is possible to contribute to an improvement of a line operating rate by eliminating line non-operation factors due to motor burnout and roller abrasion.

Second, it is possible to prevent an accident caused by system failure.

Third, it is possible to reduce investment costs by simplifying a structure and to easily perform repairs.

Fourth, it is easy to supply spare parts for repair by using general mechanical purchased parts (the torque motor is an imported custom-made product).

Fifth, it is possible to acquire a new technology by implementing a new conceptual hold-back system of a factory for assembling complete vehicles, and obtain a great ripple effect because the hold-back system may be applied to all the factories of vehicle makers where the vehicles are conveyed by platform carriages and similar systems.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
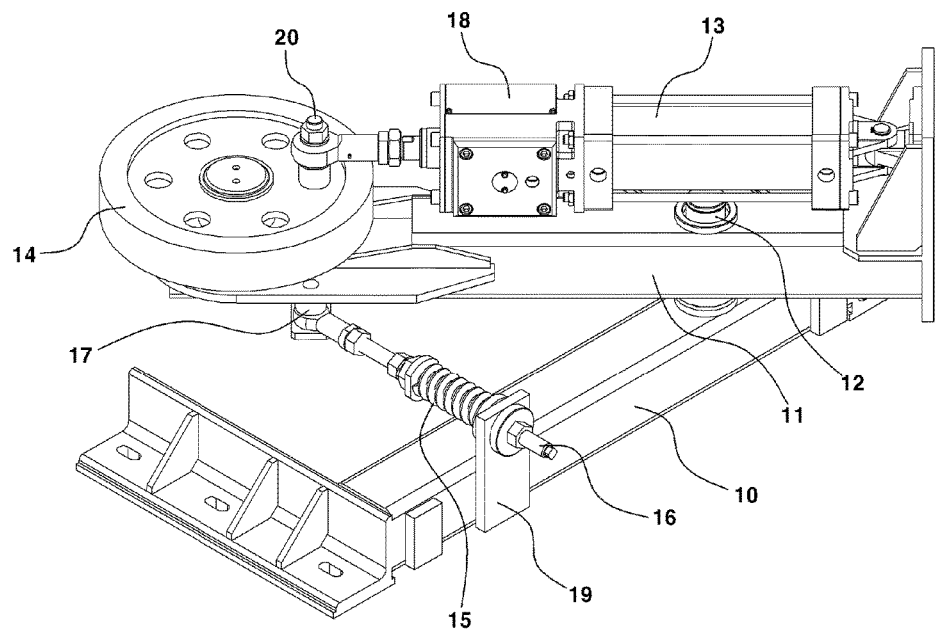
FIG. 1 is a perspective view illustrating a hold-back device for a carriage according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described in detail with reference to the accompanying drawings.

Figure 2:
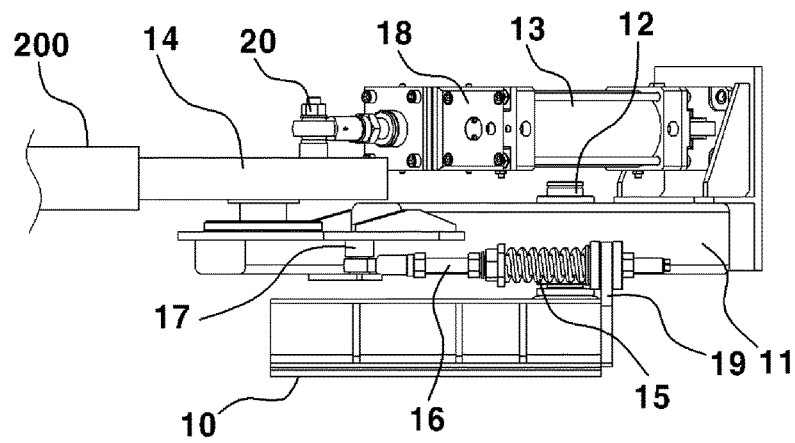
FIGS. 2 to 4 are a front view, a top plan view, and a side view, respectively illustrating the hold-back device according to the exemplary embodiment of the present invention.
Figure 3:
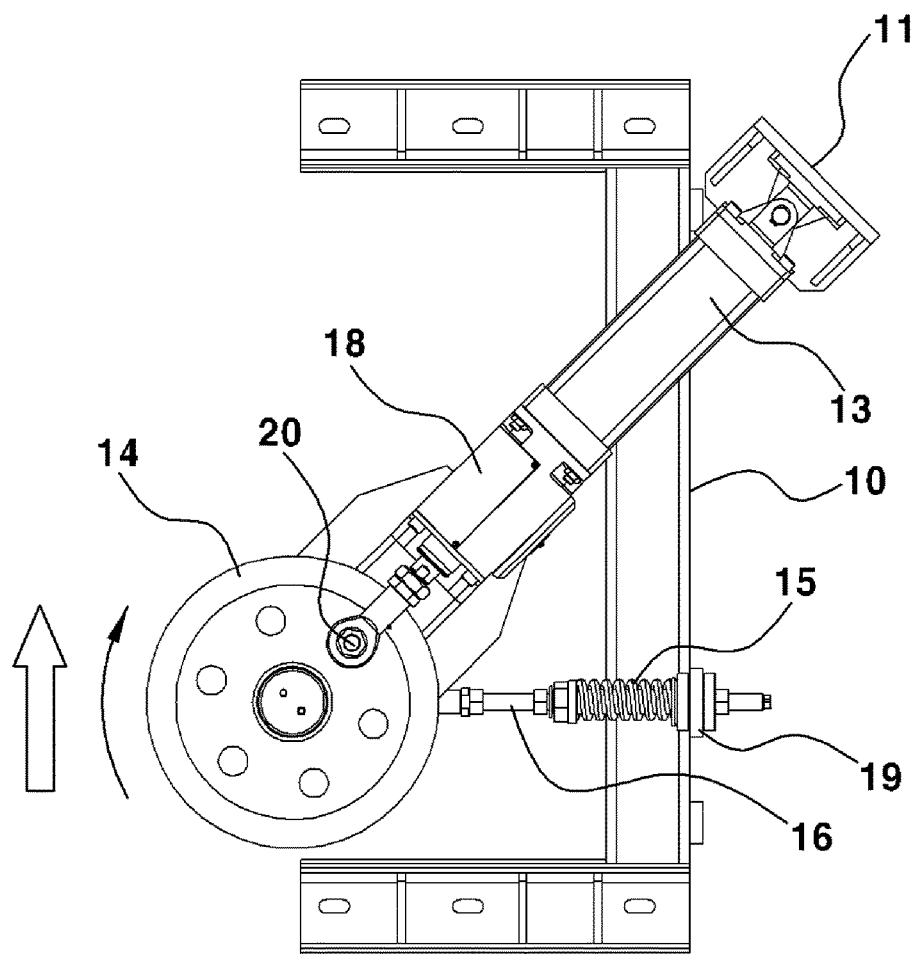
Figure 4:
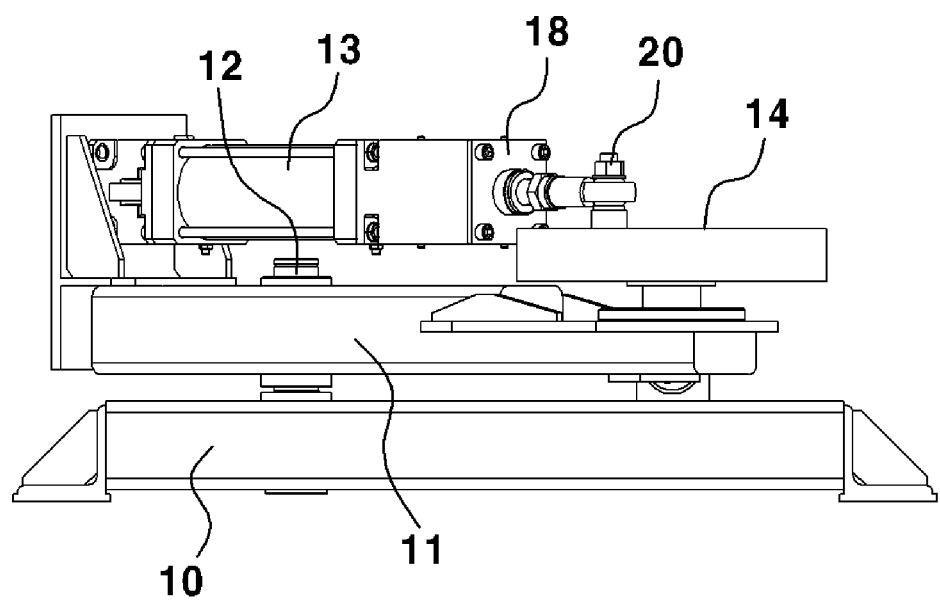

FIG. 1 is a perspective view illustrating a hold-back device for a carriage according to an exemplary embodiment of the present invention, and FIGS. 2 to 4 are a front view, a top plan view, and a side view, respectively, illustrating the hold-back device according to the exemplary embodiment of the present invention.

As illustrated in FIGS. 1 to 4, the hold-back device for a carriage rotates a cam roller, to which cylinder back pressure is applied, in a direction identical to a carriage movement direction, and applies a load to the carriage, thereby preventing an increase in a gap between the carriages.

To this end, the hold-back device for a carriage includes a main frame 10 for installing respective components, and a cylinder frame 11, which entirely has a straight bar shape, is rotatably installed on the main frame 10.

That is, the cylinder frame 11 is positioned on the upper side of the main frame 10 so as to be tilted at a predetermined angle with respect to the main frame 10, and in this state, a rear end portion of the cylinder frame 11 is coupled to the main frame 10 by means of a pin 12.

Therefore, the cylinder frame 11 may be rotated about the pin 12, and when vibration or impact, which is generated when the cam roller 14 installed on the cylinder frame 11 comes into contact with the carriage, is transferred to the cylinder frame 11, the cylinder frame 11 may be slightly rotated about the pin 12.

In addition, the hold-back device for a carriage includes a cylinder 13 as a means for providing back pressure to the cam roller 14.

The cylinder 13 is a type of air cylinder, and the cylinder 13 is disposed in parallel on the cylinder frame 11, and supported on a rear end wall body of the cylinder frame 11 by a pin structure through a rear end portion of a cylinder body.

A rod of the cylinder 13 is connected to one side of an outer peripheral portion of the cam roller 14 rotatably installed on the cylinder frame 11, and as a result, the cylinder 13 may be operated in conjunction with the cam roller 14 when the cam roller 14 is rotated.

In particular, the cylinder 13 preferably is operated without power, instead of a cylinder operated by air pressure, thereby providing back pressure when the cam roller 14 is rotated.

For example, when the cam roller 14 is rotated, the rod of the cylinder 13, which is connected to the cam roller 14, may be operated in conjunction with the cam roller 14 while being drawn out or pushed into together with the cam roller 14, and in this case, when a front port (not illustrated) and a rear port (not illustrated) of the cylinder 13 are just in an opened state, air in the cylinder is discharged or sucked into it, such that back pressure cannot be applied to the cam roller 14.

That is, the cam roller 14 is freely rotated while coming into contact with the carriage without receiving any resistance, and the rod of the cylinder just repeats forward and rearward movement, such that in turn, a load cannot be applied to the carriage.

Therefore, valves (not illustrated) are installed in the front and rear ports of the cylinder 13, respectively, and pressure of air, which is discharged from the cylinder or sucked into the cylinder, that is, back pressure is appropriately adjusted and set by adjusting opening degrees of the valves, such that it is possible to provide rotational resistance to the cam roller 14 by back pressure applied by the cylinder 13.

Here, the back pressure of the cylinder may be appropriately set through several times calibration in consideration of a movement speed of the carriage, and various methods of adjusting the back pressure of the cylinder by adjusting opening degrees of the valves may be adopted without being particularly limited as long as the methods are typically known to the technical field.

Further, the cylinder 13 includes a brake device 18 for stopping the operation of the cylinder and the rotation of the cam roller.

In this case, the brake device 18 is integrally assembled to a front end portion of the cylinder 13 and serves to brake the cam roller 14 to stop the rotation of the cam roller 14 when the line is stopped, and as a result, the carriage is stopped at the same time as the cam roller 14 stops by the brake device 18.

Here, the combination of the cylinder 13 and the brake device 18 may adopt a brake cylinder in which a cylinder side power line is removed from a typical brake cylinder, and a valve is mounted in a port.

In addition, the hold-back device for a carriage includes the cam roller 14 as a means that provides a load to the carriage while substantially coming into contact with the carriage.

The cam roller 14 is rotatably installed on an upper surface of a tip portion of the cylinder frame 11 by means of its own roller shaft, and the cam roller 14 is positioned at a side of a movement line of the carriage, and serves to provide a load to the carriage through back pressure of the cylinder while being rotated through frictional contact with the carriage.

Since the load is applied to the carriage by the cam roller 14, a gap between the carriages is not increased.

Further, the cam roller 14 is eccentrically connected to the cylinder 13, and rotated in conjunction with the cylinder 13. For example, one side of the outer peripheral portion of the cam roller 14 is connected with the rod of the cylinder 13 by means of a roller pin 20, and as a result, the cam roller 14 has a cooperative relationship with the cylinder 13, and may come into contact with the carriage by being rotated in a direction identical to a carriage movement direction, for example, clockwise while receiving back pressure from the cylinder.

In addition, the hold-back device for a carriage includes a spring 15 and a spring bar 16 as a means that pushes the cam roller 14 toward the carriage by using spring force.

The spring bar 16 is disposed between the cylinder frame 11 and the main frame 10, and in this case, a tip portion of the spring bar 16 is connected to a bottom surface of the tip portion of the cylinder frame 11 by a hinge pin 17, and a rear end portion of the bar is penetratively supported by a vertical plate 19 disposed on the main frame 10.

Further, the spring 15 is disposed to be fitted around the spring bar 16 concentrically with the spring bar 16, and installed to be interposed between the spring bar 16 and the vertical plate 19 by means of front and rear ends thereof.

Therefore, the spring 15, which uses the vertical plate 19 as a support end, always pushes the spring bar 16 to the line to which the carriage 200 moves, and as a result, the entirety of the cylinder frame 11 including the cam roller 14 and the cylinder 13 is pushed toward the carriage 200, such that the cam roller 14 may come into close contact with the carriage 200 by elasticity.

Of course, the spring 15 may provide elastic force while being maintained in a slightly compressed state in a state in which the cam roller 14 and the carriage 200 are in contact with each other. In addition, the spring 15 may provide elastic force by being appropriately compressed and restored by the spring bar 16 that is slightly moved forward and rearward in accordance with a contact state between the cam roller 14 and the carriage 200.

Therefore, when the carriage 200 is pushed by the driving unit in each line in a factory for assembling the complete vehicles, thirty to forty carriages move simultaneously along a free roller track.

Further, the cam roller 14, which is operated in conjunction with the cylinder 13, applies a load to the carriage by using back pressure/discharged air from the cylinder 13 while coming into contact with a side surface of the carriage 200 and being simultaneously rotated in a direction identical to the carriage movement direction, thereby preventing an increase gap between the carriages.

Further, when the line is stopped and then the carriage is stopped during the movement of the carriage, the brake device 18 embedded in the cylinder 13 is operated by a stop signal, and the cam roller 14 is stopped to hold the carriage, such that the carriage may be maintained in a stopped state as it is without being pushed by inertia.

As described above, the present invention implements a new conceptual hold-back system, which may prevent an increase in the gap between the carriages while providing a load to the carriage by using a combination of the cylinder and the cam roller, thereby preventing an accident caused by an increase in the gap between the carriages, and improving a system operating rate.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hold-back device for a carriage, comprising:
   a cam roller which rotates while coming into contact with the carriage;
   a cylinder which is connected to one side of the cam roller through a rod and provides back pressure by being operated in conjunction with the cam roller when the cam roller is rotated; and
   a spring bar which has a tip portion that is connected to a cylinder frame, on which the cam roller is installed, by a hinge pin, and a rear end portion that is penetratively supported by a vertical plate disposed on a main frame, and pushed to an assembly line by a receiving force from a spring,
   wherein a load is applied to the carriage through the cam roller by back pressure from the cylinder and discharged air from the cylinder,
   wherein the cam roller is eccentrically connected to the cylinder and rotated in conjunction with the cylinder.

2. The hold-back device of claim 1, wherein one side of a peripheral portion of the cam roller is connected with the rod of the cylinder by a roller pin, and the rod of the cylinder is also operated in conjunction with the cam roller while being drawn out or pushed in together with the cam roller when the cam roller is rotated by coming into contact with the carriage.

3. The hold-back device of claim 2, wherein the cylinder is configured to adjust the back pressure by adjusting opening degrees of valves installed in front and rear ports of the cylinder.

4. The hold-back device of claim 2, wherein the cam roller and the cylinder are installed to be supported on the cylinder frame rotatably installed on the main frame.

5. The hold-back device of claim 1, wherein the cylinder is configured to adjust the back pressure by adjusting opening degrees of valves installed in front and rear ports of the cylinder.

6. The hold-back device of claim 1, wherein the cam roller and the cylinder are installed to be supported on the cylinder frame rotatably installed on the main frame.

7. The hold-back device of claim 6, wherein the cylinder frame is positioned on an upper side of the main frame so as to be tilted at a predetermined angle with respect to the main frame, and a rear end portion of the cylinder frame is coupled to the main frame by a pin such that the cylinder frame is rotatably installed.

8. A hold-back device for a carriage, comprising:
   a cam roller which rotates while coming into contact with the carriage;
   a cylinder that is connected to one side of the cam roller through a rod, provides back pressure while being operated in conjunction with the cam roller when the cam roller is rotated, and includes a brake device that is integrally assembled to a front end portion of the cylinder and stops an operation of the cylinder and the rotation of the cam roller; and
   a spring bar which has a tip portion that is connected to a cylinder frame, on which the cam roller is installed, by a hinge pin, and a rear end portion that is penetratively supported by a vertical plate disposed on a main frame, and pushed to an assembly line by a receiving force from a spring,
   wherein a load is applied to the carriage through the cam roller by back pressure from the cylinder and discharged air from the cylinder, and the rotation of the cam roller is stopped by being braked through operation of the cylinder when the assembly line is stopped,
   wherein the cam roller is eccentrically connected to the cylinder and rotated in conjunction with the cylinder.

9. The hold-back device of claim 8, wherein the cylinder is configured as a brake cylinder in which the brake device is integrally assembled to the front end portion of the cylinder.

10. A hold-back device for a carriage, comprising:
    a cam roller which rotates while coming into contact with the carriage;
    a cylinder which is connected to one side of the cam roller through a rod and provides back pressure by being operated in conjunction with the cam roller when the cam roller is rotated;
    a spring which pushes the cam roller toward the carriage by spring force; and
    a spring bar which has a tip portion that is connected to a cylinder frame, on which the cam roller is installed, by a hinge pin, and a rear end portion that is penetratively supported by a vertical plate disposed on a main frame, and pushed to an assembly line by a receiving force from the spring,
    wherein a load is applied to the carriage through the cam roller by back pressure from the cylinder and discharged air from the cylinder, and the cam roller comes into contact with the carriage by spring elasticity,
    wherein the cam roller is eccentrically connected to the cylinder and rotated in conjunction with the cylinder.

11. The hold-back device of claim 10, wherein the spring is disposed to be fitted around the spring bar concentrically, and interposed between the spring bar and a vertical plate by means of front and rear ends thereof so as to push the spring bar to the assembly line.

12. The hold-back device of claim 10, wherein the cylinder includes a brake device that is integrally assembled to a front end portion of the cylinder and connected to one side of the cam roller through the rod, provides back pressure while being operated in conjunction with the cam roller when the cam roller is rotated, and stops an operation of a cylinder and the rotation of the cam roller, the load is applied to the carriage by back pressure and discharged air from the cylinder that is operated in conjunction with the cam roller, the rotation of the cam roller is stopped by being braked through operation of the cylinder when the assembly line is stopped, and the cam roller comes into contact with the carriage by spring elasticity.

* * * * *